United States Patent [19]

Totty

[11] 3,743,019

[45] July 3, 1973

[54] SAND CONTROL METHOD
[75] Inventor: Kenneth D. Totty, Duncan, Okla.
[73] Assignee: Halliburton Company, Duncan, Okla.
[22] Filed: Apr. 10, 1972
[21] Appl. No.: 242,837

[52] U.S. Cl. .............................. 166/276, 166/295
[51] Int. Cl. .................... E21b 33/138, E21b 43/02
[58] Field of Search ................... 166/295, 276, 281, 166/300; 61/36 R

[56] References Cited
UNITED STATES PATENTS

| | | | |
|---|---|---|---|
| 3,123,137 | 3/1964 | Young et al. | 166/295 |
| 3,199,590 | 8/1965 | Young | 166/295 |
| 3,209,826 | 10/1965 | Young | 166/295 X |
| 3,330,350 | 7/1967 | Maly | 166/295 X |
| 3,393,739 | 7/1968 | Rosenberg | 166/295 |
| 3,416,601 | 12/1968 | Young et al. | 166/295 X |
| 3,537,522 | 11/1970 | Harnsberger | 166/295 |
| 3,548,944 | 12/1970 | Hess | 166/295 |
| 3,592,268 | 7/1971 | Harnsberger | 166/295 |
| 3,692,116 | 9/1972 | Sparlin | 166/295 |

Primary Examiner—Stephen J. Novosad
Attorney—John H. Tregoning et al.

[57] ABSTRACT

The present invention relates to a method of controlling loose sands and the like in a subterranean earth formation wherein an acid curable resin composition is cured within the formation by contact with an acyl halide hardening agent thereby consolidating the loose sands into a hard permeable mass.

26 Claims, No Drawings

SAND CONTROL METHOD

This invention relates to an improved method of controlling loose sands and the like contained in subterranean earth formations, and more particularly, to controlling such loose sands contained in water, oil and gas well producing formations.

Various sand control methods have been employed to prevent the migration of loose sands and the like with fluids produced from subterranean producing formations. A particularly successful method of achieving control of such formation sands involves placing an acid curable resin composition into the formation and thereafter curing the composition into a hard permeable mass by contact with an acid forming hardening agent. Generally, the acid forming hardening agent is dissolved in a carrier liquid and the resulting solution is flushed through the formation containing the resin composition.

By the present invention an improved method of the type described above for controlling loose sands and the like is provided wherein the sands are formed into a hard permeable mass having improved compressive strengths and other desired properties.

The method of the present invention basically comprises introducing an acid curable resin composition into a formation containing loose sands and the like and thereafter, introducing an overflush solution into the formation containing an acyl halide hardening agent. Contact of the resin composition with an acyl halide hardening agent causes the resin to cure or harden into an insoluble highly resistant solid material.

Acyl halide hardening agents which are suitable for use in accordance with the present invention are those having the general formula

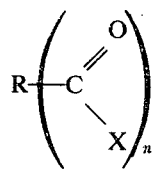

wherein
X is fluorine, chlorine, bromine or iodine,
n is an integer in the range of about 1 to 4, and
R is selected from the group consisting of straight, branched, or cyclic chain alkane or alkene radicals having in the range of from one to about 25 carbon atoms and having from zero to about four hydrogen atoms replaced with fluorine, chlorine, bromine, iodine or mixtures thereof; straight, branched or cyclic chain alkane or alkene radicals having in the range of from one to about 25 carbon atoms and having from one to two hydrogens replaced with methoxy or ethoxy groups or mixtures thereof; and straight, branched or cyclic chain alkane or alkene radicals having in the range of from one to about 25 carbon atoms and having a hydrogen atom replaced with sulfonyl, nitrogen or nitro groups.

Some examples of the acyl halides of this group are acetyl chloride; myristoyl chloride; stearoyl chloride; fumaryl chloride; trimethylacetyl chloride; sebacoyl chloride; 10-undecenoyl chloride; 3-carbomethoxypropionyl chloride; chlorosulfonylacetyl chloride; itaconyl chloride; glutaryl chloride; cyclohexanecarbonyl chloride; trans-3,6,-endomethylene-1,2,3,6,tetrahydrophthaloyl chloride; and 1-adamantane carboxylic acid chloride.

Other acyl halide hardening agents suitable for use in the present invention are those having the general formula

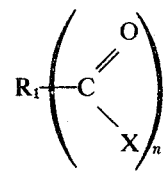

wherein
X is fluorine, chlorine, bromine or iodine,
n is an integer in the range of from 1 to 4, and
$R_1$ is selected from the group consisting of aromatic radicals having one or two rings and having from zero to about four hydrogen atoms replaced with straight or branched chain alkane or alkene radicals having in the range of from one to about 10 carbon atoms; aromatic radicals having one or two rings and having from one to about four hydrogen atoms replaced with fluorine, chlorine, bromine, iodine or mixtures thereof; aromatic radicals having one or two rings and having from one to about three hydrogen atoms replaced with methoxy or ethoxy groups or mixtures thereof; and aromatic radicals having one or two rings and having a hydrogen atom replaced with sulfonyl or nitro groups.

Examples of the acyl halides of this group are a, chloro-a, a-diphenylacetyl chloride; o-fluorobenzoyl chloride; P-(fluorosulfonyl)-benzoyl chloride; m-trifluoromethylbenzoyl fluoride; 3-4-5-trimethoxybenzoyl chloride; b-naphthoyl chloride; benzoyl chloride; benzoyl bromide; and phthaloyl chloride.

Additional acyl halide hardening agents which are suitable for use are those having the general formula

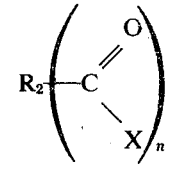

wherein
X is fluorine, chlorine, bromine or iodine,
n is an integer in the range of from 1 to about 4, and
$R_2$ is selected from the group consisting of heterocyclic radicals having one or two rings and having from zero to about two nitrogen atoms in the rings, from zero to one oxygen atom in the rings, from zero to one sulfur atom in the rings, from zero to one nitrogen atom in combination with one oxygen atom in the rings, or from zero to one nitrogen atom in combination with one sulfur atom in the rings; heterocyclic radicals having one or two rings and having from one to about four hydrogen atoms replaced with fluorine, chlorine, bromine, iodine or mixtures thereof; heterocyclic radicals having one or two rings and having from one to about three hydrogen atoms replaced with methoxy or ethoxy groups or mixtures thereof; and heterocyclic radicals having one or two rings and having from one to two hydrogen atoms replaced with sulfonyl or nitro groups.

Examples of acyl halide compounds of this group are 2-furoyl chloride and 2-quinoxaloyl chloride.

Another group of acyl halide hardening agents which can be used in accordance with the present invention are those having the general formula:

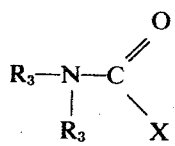

wherein

X is fluorine, chlorine, bromine or iodine, and $R_3$ is hydrogen or a straight or branched chain alkane or alkene radical having in the range of from about one to 25 carbon atoms.

An example of an acyl halide compound of this group is diethyl carbamyl chloride.

Of the foregoing acyl halide hardening agents, the preferred acyl halide hardening agents, for use in accordance with the method of the present invention have the general formula

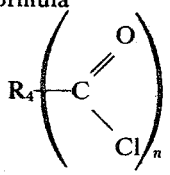

wherein n is an integer in the range of from 1 to 2 and $R_4$ is selected from the group consisting of straight or branched chain alkane and alkene radicals having in the range of one to about 10 carbon atoms and having from zero to one hydrogen atoms replaced with a chlorosulfonyl group and aromatic radicals having one ring and having from zero to about three hydrogen atoms replaced with straight or branched chain alkane radicals having the range of one to about four carbon atoms.

Examples of the preferred acyl halide hardening agents within the scope of the above formula are acetyl chloride, benzoyl chloride, phthaloyl chloride, octanoyl chloride, glutaryl dichloride, trimethylacetyl chloride, sebacoyl chloride, itaconyl chloride, 10-undecenoyl chloride, fumaryl chloride and chlorosulfonylacetyl chloride. Of these acyl halide hardening agents, acetyl chloride, benzoyl chloride, phthaloyl chloride, glutaryl dichloride and fumaryl chloride are most preferred.

In carrying out the method of the present invention an acid curable resin composition is deposited in the formation to be treated so that loose sands contained therein or particulated solids introduced therein are coated with the resin composition. After this step has been completed, the resin composition is hardened by contact with an acid forming acyl halide hardening agent. Preferably, the hardening agent is dissolved in a carrier liquid and the carrier liquid-hardening agent solution is pumped into the formation. As the carrier liquid-hardening agent solution is flushed through the formation it performs the dual function of contacting the resin composition with the acid forming acyl halide compound causing it to subsequently harden, and removing excess resin composition from the formation so that the resulting solid sand pack acts as a filter when the formation is returned to production, i.e., produced fluids pass through the pack but sand and other loose materials in the formation are retained.

Any of a variety of acid curable resin compositions may be utilized in accordance with the present invention. Suitable such resin compositions are those selected from the group consisting of liquid organic acid curable thermosetting resins, chemicals which form such resins, and mixtures thereof. Examples of these resins are furfuryl alcohol resin, phenol aldehyde resins, e.g., phenol formaldehyde resin, and urea aldehyde resins, e.g., urea formaldehyde. An example of a chemical which forms such a resin is furfuryl alcohol. Preferred resin compositions for use in the present invention are mixtures of furfuryl alcohol with furfuryl alcohol resin, phenol formaldehyde resin or urea formaldehyde resin wherein the mixture has a viscosity at 25°C of less than about 100 cps. The most preferred resin composition is a mixture of furfuryl alcohol and furfuryl alcohol resin having a viscosity at 25°C in the range of from about 5 to about 25 cps. The resin composition may contain other components such as water, organofunctional coupling agents, de-emulsifying surfactants, clay treating chemicals, etc.

After a resin composition is placed into the formation to be treated, a substantially water free liquid overflush solution having an acyl halide hardening agent of the type described above dissolved therein may be introduced into the formation so that the hardening agent produces acid when it contacts water contained in the resin composition. Water may be present in the resin composition either from water already in the formation or by making water a component of the resin composition. Thus, the production of acid from the acid forming hardening agent is delayed until the hardening agent reaches the formation and contacts the resin composition thereby minimizing the likelihood of a premature curing of the resin before sufficient permeability has been attained by the passage of the overflush solution through the formation.

The acyl halide hardening agents of the present invention readily react with alcohols to form esters. In carrying out the invention using the preferred acid curable resin compositions, the acyl halide hardening agent reacts with furfuryl alcohol contained in the resin composition to form the respective ester and a hydrohalide acid. The produced acid functions to harden the preferred acid curable resin composition.

The preferred acid forming hardening agents described above generally exist in the liquid state at atmospheric conditions and readily lend themselves to dissolution in a carrier liquid. While a variety of carrier liquids may be utilized in accordance with the present invention, a liquid aliphatic or aromatic hydrocarbon having a viscosity such that it can readily be injected through a resin treated matrix is particularly suitable. Aliphatic liquid hydrocarbons having a viscosity at 25°C in the range of from about 1 to 100 cps are preferred. The most preferred carrier liquid is an aliphatic hydrocarbon such as diesel oil having a viscosity at 25°C in the range of from about 1 to about 25 cps.

When a carrier liquid is used, the acyl halide hardening agent should exhibit a minimum solubility in the carrier liquid of 0.005 parts per 100 parts by weight of carrier liquid at 25°C. Preferably, the hardening agent is dissolved in the carrier liquid in an amount in the range of from about 0.005 percent by weight to 25 percent by weight. Most preferably, the acyl halide hardening agent is dissolved in the carrier liquid in an amount of from about 0.005 percent to about 5 percent by weight. The carrier liquid may also contain a de-emulsifying surfactant.

A preferred technique for carrying out the method of the present invention is to first pump the resin composition used into the formation so that sand and/or other loose particles within the formation are coated with the resin composition. If desired, a small quantity of a spacer liquid may next be pumped into the formation for the purpose of removing excess resin composition from the existing pore spaces in the formation. An overflush solution containing an acyl halide hardening agent is next pumped into the formation. The overflush solution removes additional excess resin composition from the pores of the sand or formation, and acid produced by the hardening agent causes the polymerization of the resin composition which results in forming the sand into a hard permeable mass.

Prior to treating the formation as outlined above, the well should be cleaned of foreign material such as drilling mud and other drilling and treating chemicals. This may be accomplished by circulating diesel oil, brine or other liquid mud clean-out agents into the formation in a conventional manner. In addition, a preflush solution may be pumped into the formation containing a surfactant so that water-wet surface properties are given to the sands in the formation.

An alternate technique which may be employed in carrying out the present invention is to disperse a quantity of the resin composition used into a carrier fluid which is substantially immiscible with the resin composition, e.g., diesel oil. A quantity of particulated solids, preferably sand, is next introduced into the resin composition-carrier fluid dispersion so that the solids are coated with the resin composition. The carrier fluid containing the resin coated solids is then pumped against the formation so that the resin coated solids form a permeable pack.

After the resin coated solids are deposited against the formation, an overflush solution containing the acyl halide hardening agent used is flushed through the formation to cause the curing of the resin composition in the manner described above. Clean-out and preflush solutions of the type described above may be utilized prior to depositing the resin coated solids against the formation, and a liquid spacer may be pumped into the formation prior to pumping the overflush solution therein if desired. This alternate technique for carrying out the method of the present invention is advantageously used in applications where large quantities of very fine sands are contained in the formation to be treated or where a large void in the formation exists due to, for example, the previous production of formation solids with formation liquids, which void must be filled.

The following examples are set forth to more clearly illustrate the present invention, but are not to be considered as limiting the scope of the invention.

EXAMPLE 1

Resin compositions having the component make-up shown in Table I are prepared in the laboratory.

TABLE I

COMPONENT MAKE-UP OF VARIOUS RESIN COMPOSITIONS

| Component Description | Resin Composition (parts by weight) | | | | | | |
|---|---|---|---|---|---|---|---|
| | A | B | C | D | E | F | G |
| Furfuryl Alcohol Resin[1] | 121.0 | [7]1 | | | 121.0 | | |
| Phenol Formaldehyde Resin[2] | | | | | | 121.0 | |
| Urea Formaldehyde Resin[3] | | | | | | | 132.0 |
| Furfuryl Alcohol | | | 226.0 | 113 | [7]1 | 113.0 | 226.0 | 226.0 |
| Silane[4] | | | 1.42 | 1.42 | | 0.95 | 1.42 | 1.42 |
| Water | | | 10.0 | | | | | 47.5 |
| Surfactant | | | [5]1.43 | | | [6]0.96 | [5]1.43 | |
| Diethyl Phthalate | | | 30.6 | | | | | |
| Urea | | | | | | | | 44.6 |

[1] Durez 21681-Furfuryl Alcohol resin having a viscosity at 25°C in the range of about 240 to 440 cps, and a specific gravity in the range of about 1.205 to 1.220, a pH in the range of about 4 to 4.8 and an average molecular weight of about 225.
[2] Durez 21587-Phenol Formaldehyde resin having a viscosity at 100°F of about 1000 cps and a pH of about 6.8.
[3] Allied Chemical Corporation UF-85 Concentrate (25 parts by weight urea, 60 parts by weight formaldehyde and 15 parts by weight water) having a maximum viscosity at 25°C of 300 cps and a pH of about 8.
[4] Gamma Aminopropyltriethoxysilane.
[5] A de-emulsifying surfactant comprised of a blend of alkyl and aryl sulfonates and complex nonionics sold under the Halliburton Company tradename HYFLO™.
[6] A de-emulsifying surfactant comprised of cationics sold under the Halliburton Company tradename 5-N.
[7] Pure Component Tested.

Quantities of sand (70–170 mesh) are placed in 25 mm O.D. thin wall glass tubes to 3 inch heights to simulate sands in well producing formations. The glass tubes include inlet and outlet connections so that fluids may be passed therethrough and the sands are consolidated into hard permeable masses by the method of the present invention using the various resin compositions shown in Table I and tested for compressive strength.

Procedure

The sand contained in each glass tube is treated as follows:

1. A preflush solution consisting of 100 cc of diesel oil containing 1 percent by volume surfactant (HYFLO) is flushed through the glass tube,
2. 50 cc of the particular resin composition tested is next injected into the tube,
3. 50 cc of a diesel oil spacer solution containing 0.5 percent by volume surfactant (HYFLO) is flushed through the tube, and
4. a 350 cc diesel oil solution containing 0.8 percent by volume phthaloyl chloride hardening agent and 0.5 percent by volume surfactant (HYFLO) is flushed through the tube.

The above mentioned solutions are injected into each tube at 72°F using 15 psig air pressure to assist the solutions through the sand. After the above treatment, each tube is placed into a 180°F water bath and allowed to cure for 1 hour. The resulting sand consolidations are cooled to 80°F and compressive strength measurements are taken in a conventional manner. The results of these tests are shown in Table II.

TABLE II

COMPRESSIVE STRENGTHS OF SAND CONSOLIDATIONS USING VARIOUS RESIN COMPOSITIONS AND PHTHALOYL CHLORIDE HARDENING AGENTS

| Resin Composition[1] | 80°F Compressive Strength (psi) |
|---|---|
| A | 1375 |
| B | 3616 |
| C | 225[2] |
| D | 69[2] |
| E | 2705 |
| F | 3929 |
| G | 696 |

[1] See Table I for component make-up.
[2] Allowed to cure for 24 hours prior to compressive test.

From the above it may be seen that consolidations having excellent strength properties are obtained by the method of the present invention, and while sand consolidations may be obtained using furfuryl alcohol alone, such consolidations are not as strong as those made from a resin in combination with furfuryl alcohol.

EXAMPLE 2

Various sand consolidations are made using the furfuryl alcohol resin composition A shown in Table I and various acyl halide catalysts. The procedure set forth above in Example 1 is followed except that the catalyst solution consists of diesel oil containing 1% by volume of the various acyl halide compounds and 0.5% by volume surfactant (HYFLO). The results of these tests are shown in Table III below.

TABLE III

COMPRESSIVE STRENGTHS OF SAND CONSOLIDATIONS USING FURFURYL ALCOHOL RESIN COMPOSITION "A" AND VARIOUS ACYL HALIDE HARDENING AGENTS

| Acyl Halide Hardening Agent | 80°F Compressive Strength (psi) |
| --- | --- |
| Octonyl chloride | 1028 |
| Glutaryl dichloride | 2616 |
| Diethyl carbamyl chloride | 471 |
| Myristoyl chloride | 892 |
| Beta-Naphthoyl chloride[1] | 1075 |
| Trifluoromethylbenzoyl fluoride | 974 |
| Benzoyl bromide | 1014 |
| Trimethylacetyl chloride | 865 |
| 2,4-dichlorobenzoyl chloride | 771 |
| Sebacoyl chloride | 2052 |
| O-Fluorobenzoyl chloride | 771 |
| Itaconyl chloride | 1855 |
| 3-Carbomethoxypropionyl chloride[1] | 1975 |
| Trans-3,6-endomethylene 1,2,3,6 tetrahydrophthaloyl chloride | 2289 |
| 2-Quinoxaloyl chloride | 1317 |
| P-(Fluorosulfonyl) benzoyl chloride[1] | 2171 |
| a-chloro-a, a-diphenylacetyl chloride[1] | 1266 |
| 3,4,5-trimethoxybenzoyl chloride | 1050 |
| 3,5-dinitrobenzoyl chloride[1] | 404 |
| 10-Undecenoyl chloride | 908 |
| Stearoyl chloride | 1186 |
| Fumaryl chloride | 3244 |
| Cyclohexane carbonyl chloride | 1329 |
| m-nitrobenzoyl chloride | 1345 |
| Chlorosulfonylacetyl chloride[2] | 3339 |
| 1-adamantane carboxylic acid chloride | 1240 |
| 2-Furoyl chloride | 393 |

[1] Solid compound dissolved in diesel oil to maximum extent possible, but less than 1% by weight.
[2] Liquid compound dissolved in diesel oil to maximum extent possible, but less than 1% by weight.

EXAMPLE 3

Sand consolidations are made using the furfuryl alcohol resin composition E shown in Table I and phthaloyl chloride, benzoyl chloride and acetyl chloride hardening agents. The general procedure set forth in Example 1 is followed except that the hardening agent is dissolved in diesel oil in various quantities and various quantities of the resulting solution are flushed through the sands. The results of these tests are shown in Table IV below.

TABLE IV

COMPRESSIVE STRENGTHS OF SAND CONSOLIDATIONS USING FURFURYL ALCOHOL RESIN COMPOSITION "E" AND VARIOUS ACYL HALIDE HARDENING AGENTS

| Acyl Halide Hardening Agent | Hardening Agent Concentration in Diesel Oil (% by weight) | Quantity of Hardening Agent-Diesel Oil Solution Utilized | 80°F Compressive Strength (psi) |
| --- | --- | --- | --- |
| Phthaloyl chloride | 0.005 | 1000 | 1750 |
| Phthaloyl chloride | 0.8 | 350 | 1375 |
| Phthaloyl chloride | 5.0 | 100 | 2188 |
| Phthaloyl chloride | 10.0 | 100 | 893 |
| Phthaloyl chloride | 25.0 | 100 | 457 |
| Benzoyl chloride | 0.005 | 1000 | 489 |
| Benzoyl chloride | 1.0 | 350 | 2170 |
| Benzoyl chloride | 5.0 | 100 | 2697 |
| Benzoyl chloride | 10.0 | 100 | 2241 |
| Benzoyl chloride | 25.0 | 100 | 1050 |
| Acetyl chloride | 0.005 | 1000 | 938 |
| Acetyl chloride | 1.0 | 350 | 2849 |
| Acetyl chloride | 5.0 | 100 | 2033 |
| Acetyl chloride | 50.0 | 100 | 800 |

EXAMPLE 4

Sand consolidations are made using the Furfuryl Alcohol Resin Composition E shown in Table I above as follows:

Procedure

Quantities of sand (70–170 mesh) are placed in 25 mm O.D. glass tubes to 1½ inch heights to simulate sands in well formations. Quantities of furfuryl alcohol resin composition (equivalent to 3 or 5 gallons per sack of 40–60 mesh sand) are dispersed in 250 cc quantities of a diesel oil carrying fluid and 40–60 mesh sand is added to the diesel oil-resin dispersions. The resulting resin coated 40–60 mesh sand-carrying fluid mixtures are circulated by a pump through a laboratory test system for periods of time and at temperatures simulating pumping the mixtures into well formations of various depths. After circulating the mixtures as shown in Table V below, they are flowed through the glass tubes containing 70–170 mesh sand so that the resin coated solids (40–60 mesh sand) are deposited therein. The sands are next caused to harden into permeable masses by flushing 60 cc quantities of diesel oil containing 0.5 percent by volume surfactant (HYFLO) and 350 cc of diesel oil containing 1 percent by volume of various acid forming hardening agents and 0.5 percent by volume surfactant (HYFLO) therethrough. After curing at the temperatures shown in Table V, the consolidations are cooled to 80°F and tested for compressive strength. The results of these tests are shown in Table VI below.

TABLE V

CIRCULATION OF TEST MIXTURES TO SIMULATE VARIOUS FORMATION DEPTHS AND TEMPERATURES

| | Test No. 1 | Test No. 2 | Test No. 3 |
| --- | --- | --- | --- |
| Circulation Time, Min. | 20 | 30 | 45 |
| Circulation | | | |

| | | | |
|---|---|---|---|
| Temperature, °F | 75 | 75 initial to 105 final | 75 initial to 135 final |
| Temperature at which test mixtures injected into glass tubes containing 70-170 mesh sand | 75 | 105 | 135 |
| Simulated formation depth, feet | 2000 | 4000 | 7000 |
| Simulated formation resin cure temperature, °F | 100 | 140 | 180 |

| | | | | |
|---|---|---|---|---|
| Benzoyl chloride | 105 | 180 | 24 | 2384 |
| Benzotrichloride | 105 | 180 | 24 | 1499 |

[1] Maximum amount dissolved in diesel oil carrier liquid, but less than 1% by weight.

From the above data, it may clearly be seen that the method of the present invention utilizing an acyl halide hardening agent results in superior sand consolidations as compared to methods using other hardening agents.

TABLE VI

COMPRESSIVE STRENGTHS OF SAND CONSOLIDATIONS USING FURFURYL ALCOHOL RESIN COMPOSITION "E" AND VARIOUS ACID FORMING HARDENING AGENTS

| Hardening Agent | Ratio of Resin Composition to Sack of 40-60 Mesh Sand, Gal/Sack | Circulation Test No. (See Table V) | Cure Time, Hours | Core Section Tested | 80°F Compressive Strength (PSI) |
|---|---|---|---|---|---|
| Benzoyl chloride | 5 | 1 | 24 | 70-170 mesh sand | 3893 |
| | | | | 40-60 mesh sand | 2643 |
| Benzotrichloride | 5 | 1 | 24 | 70-170 mesh sand | Unset |
| | | | | 40-60 mesh sand | Unset |
| Benzoyl Chloride | 3 | 2 | 4 | 70-170 mesh sand | 3321 |
| | | | | 40-60 mesh sand | 2679 |
| Benzotrichloride | 3 | 2 | 4 | 70-170 mesh sand | 268 |
| | | | | 40-60 mesh sand | 357 |
| Benzoyl chloride | 3 | 3 | 1 | 70-170 mesh sand | 2305 |
| | | | | 40-60 mesh sand | 2705 |
| Benzotrichloride | 3 | 3 | 1 | 70-170 mesh sand | 1086 |
| | | | | 40-60 mesh sand | 2696 |

From the above data it may be seen that higher compressive strengths are obtained using an acyl halide hardening agent in accordance with the method of the present invention as compared to those obtained using benzotrichloride as a hardening agent.

EXAMPLE 5

Sand consolidations are made using the Furfuryl Alcohol Resin Composition A shown in Table I above. The general procedure set forth in Example 1 above is followed except that various cure temperatures, cure times and acid and acid forming hardening agents are used. The results of these tests are shown in Table VII below.

TABLE VII

COMPRESSIVE STRENGTHS OF SAND CONSOLIDATIONS USING FURFURYL ALCOHOL RESIN COMPOSITION "A" AND VARIOUS ACID AND ACID FORMING HARDENING AGENTS

| Hardening Agent | Temp. at which hardening agent solution injected into glass tubes, °F | Cure Temp. °F | Cure Period Hrs. | 80°F Compressive Strength (psi) |
|---|---|---|---|---|
| Benzoyl chloride | 70 | 70 | 24 | 1390 |
| Benzotrichloride | 70 | 70 | 24 | Unset |
| Hydrochloric acid[1] | 70 | 70 | 24 | Unset |
| Benzoic acid[1] | 70 | 70 | 24 | Unset |
| Benzoyl chloride | 95 | 120 | 1 | 735 |
| Benzotrichloride | 95 | 120 | 1 | Unset |
| Benzoyl chloride | 95 | 120 | 24 | 1175 |
| Benzotrichloride | 95 | 120 | 24 | 313 |
| Benzoyl chloride | 105 | 140 | 4 | 1774 |
| Benzotrichloride | 105 | 140 | 4 | 205 |

EXAMPLE 6

Sand consolidations are made using the Furfuryl Alcohol Resin Composition A shown in Table I, various hardening agents and simulated clayey sand. The clayey sand is prepared by blending 70-170 mesh sand with bentonite clay.

Procedure

The clayey sand (containing 2 percent bentonite) is packed in special stainless steel test chambers having teflon sleeves therein. The sand in each chamber is treated as follows:

1. A 150 cc diesel oil preflush solution containing 1% by volume surfactant (HYFLO) is passed through the chamber,
2. 80 cc of furfuryl alcohol resin is injected into the chamber,
3. 80 cc of diesel oil spacer containing 0.5 percent by volume surfactant (HYFLO) is passed through the chamber, and
4. 400 cc of diesel oil-hardening agent solution containing 0.5 percent by volume surfactant (HYFLO) is passed through the chamber.

Various treating and curing temperatures are used as well as various hardening agent concentrations in the diesel oil carrying fluid. After curing for 24 hours, the consolidations obtained are cooled to 80°F and tested for compressive strength. The results of these tests are shown in Table VIII below.

From Table VIII it may be seen that the clayey sand consolidations formed using phthaloyl chloride in accordance with the method of the present invention are superior in compressive strength as compared to the consolidations formed using trichloroacetic acid.

TABLE VIII

COMPRESSIVE STRENGTHS OF CLAYEY SAND CONSOLIDATIONS USING FURFURYL ALCOHOL RESIN COMPOSITION "A" AND VARIOUS HARDENING AGENTS

| Hardening Agent | Hardening Agent Concentration in Diesel Oil Volume % | Hardening Agent-Diesel Solution Injection Temperature °F | Cure Temperature, °F | 80°F Compressive Strength (psi) | | |
|---|---|---|---|---|---|---|
| | | | | Top | Bottom | Average |
| Phthaloyl chloride | 0.6 | 105 | 140 | 1753 | 2600 | 2177 |
| Phthaloyl chloride | 0.8 | 105 | 140 | 5338 | 6433 | 5885 |
| Trichloroacetic Acid | 2.0 | 105 | 140 | 1028 | 1299 | 1164 |
| Trichloroacetic Acid | 2.0 | 105 | 140 | 1127 | 1284 | 1205 |

EXAMPLE 7

Sand consolidations are made using the Furfuryl Alcohol Resin Composition E shown in Table I above and various hardening agent-diesel oil overflush solutions. The same general procedure as that set forth in Example 4 above is followed except that the resin coated 40-60 mesh sand-diesel oil solutions are not circulated to simulate pumping into a well formation prior to depositing the resin coated solids in the glass tubes. The results of these tests are shown in Table IX below.

TABLE IX

COMPRESSIVE STRENGTHS OF SAND CONSOLIDATIONS USING FURFURYL ALCOHOL RESIN COMPOSITION "E" AND VARIOUS HARDENING AGENT-DIESEL OIL OVERFLUSH SOLUTIONS

| Hardening Agent | Ratio of Resin Composition to Sack of 40-60 Mesh Sand, Gal/Sack | Hardening Agent-Diesel Oil Solution Injection Temperature, °F | Hardening Agent Concentration In Diesel Oil Volume % | Cure Temperature °F | Cure Time Hours | 80°F Compressive Strength, psi | |
|---|---|---|---|---|---|---|---|
| | | | | | | 40-60 mesh sand | 70-170 mesh sand |
| Trichloroacetic acid | 3 | 80 | 2 | 140 | 4 | 1014 | 1014 |
| Acetyl Chloride | 3 | 80 | 1 | 140 | 4 | 3107 | 4357 |
| Trichloroacetic acid | 3 | 60 | 2 | 60 | 24 | 1014 | 920 |
| Acetyl Chloride | 3 | 60 | 1 | 60 | 24 | 3929 | 4571 |
| Trichloroacetic acid | 5 | 60 | 2 | 60 | 24 | 939 | 752 |
| Acetyl Chloride | 5 | 60 | 1 | 60 | 24 | 3554 | 3643 |

While preferred embodiments of the present invention have been described for the purposes of disclosure, it is to be understood that the description and foregoing examples are given for the purposes of illustrating and explaining the invention, and suitable variations may be made within the scope of the appended claims without departing from the invention.

What is claimed is:

1. A method of controlling loose sands and the like in a subterranean earth formation comprising the steps of:

introducing an acid curable resin or resin forming composition into said loose sands and the like; and thereafter introducing an overflush solution containing an acid forming hardening agent into said loose sands and the like so that said resin composition is cured and said loose sands and the like are consolidated into a hard permeable mass, said acid forming hardening agent being selected from the group consisting of:

an acyl halide compound having the general formula

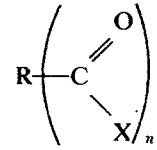

wherein X is fluorine, chlorine, bromine or iodine, n is an integer in the range of about 1 to 4, and R is selected from the group consisting of straight, branched, or cyclic chain alkane or alkene radicals having in the range of from one to about 25 carbon atoms and having from zero to about four hydrogen atoms replaced with fluorine, chlorine, bromine, iodine or mixtures thereof; straight, branched or cyclic chain alkane or alkene radicals having in the range of from one to about 25 carbon atoms and having from one to two hydrogens replaced with methoxy or ethoxy groups or mixtures thereof; and straight, branched or cyclic chain alkane or alkene radicals having in the range of from one to about 25 carbon atoms and having a hydrogen atom replaced with sulfonyl, nitrogen or nitro groups;

an acyl halide compound having the general formula

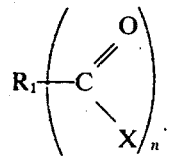

wherein X is fluorine, chlorine, bromine or iodine, n is an integer in the range of about 1 to 4, and R₁ is selected from the group consisting of aromatic radicals having one or two rings and having from zero to about four hydrogen atoms replaced with straight or branched chain alkane or alkene radicals having in the range of from one to about 10 carbon atoms; aromatic radicals having one or two rings and having from one to about four hydrogen atoms replaced with fluorine, chlorine, bromine, iodine or mixtures thereof; aromatic radicals having one or two rings and having from one to about three hydrogen atoms replaced with methoxy or ethoxy groups or mixtures thereof; and aromatic radicals having one or two rings and having a hydrogen atom replaced with sulfonyl or nitro groups;

an acyl halide compound having the general formula

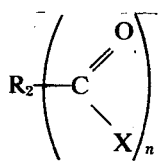

wherein X is fluorine, chlorine, bromine or iodine, n is an integer in the range of from about 1 to 4, and R₂ is selected from the group consisting of heterocyclic radicals having one or two rings and having from zero to about two nitrogen atoms in the rings, from zero to one oxygen atom in the rings, from zero to one sulfur atom in the rings, from zero to one nitrogen atom in combination with one oxygen atom in the rings, or from zero to one nitrogen atom in combination with one sulfur atom in the rings; heterocyclic radicals having one or two rings and having from one to about four hydrogen atoms replaced with fluorine, chlorine, bromine, iodine or mixtures thereof; heterocyclic radicals having one or two rings and having from one to about three hydrogen atoms replaced with methoxy or ethoxy groups or mixtures thereof; and heterocyclic radicals having one or two rings and having from one to two hydrogen atoms replaced with sulfonyl or nitro groups; and an acyl halide compound having the general formula

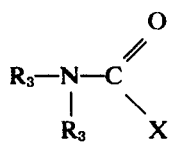

wherein X is fluorine, chlorine, bromine or iodine, and R₃ is hydrogen or a straight or branched chain alkane or alkene radical having in the range of from about one to 25 carbon atoms.

2. The method of claim 1 wherein said overflush solution is a liquid aromatic or aliphatic hydrocarbon and said acyl halide hardening agent has a solubility at 25°C in said liquid hydrocarbon of at least about 0.005 parts by weight of said acyl halide hardening agent per 100 parts by weight of said liquid hydrocarbon.

3. The method of claim 2 wherein said acid curable composition is selected from the group consisting of a mixture of urea formaldehyde resin and furfuryl alcohol, a mixture of phenol formaldehyde resin and furfuryl alcohol and a mixture of furfuryl alcohol resin and furfuryl alcohol, said composition having a viscosity at 25°C of less than about 100 cps.

4. The method of claim 3 wherein said overflush solution is an aliphatic hydrocarbon having a viscosity at 25°C within the range of 1 to about 100 cps.

5. The method of claim 4 wherein said acyl halide hardening agent is present in the aliphatic hydrocarbon within the range of about 0.005 to about 25 parts by weight of said acyl halide hardening agent per 100 parts by weight of said aliphatic hydrocarbon.

6. A method of controlling loose sands and the like in a subterranean formation comprising the steps of:

introducing an acid curable resin or resin forming composition into said loose sands and the like; and thereafter introducing an overflush solution comprising a liquid aliphatic or aromatic hydrocarbon having dissolved therein an acid forming hardening agent into said loose sands and the like so that said resin composition is cured and said loose sands and the like are consolidated into a hard permeable mass, said acid forming hardening agent being selected from the group consisting of:

an acyl halide having the general formula

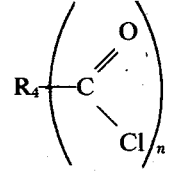

wherein n is an integer in the range of 1 to 2 and R₄ is selected from the group consisting of straight or branched chain alkane and alkene radicals having in the range of one to about 10 carbon atoms and having from zero to one hydrogen atoms replaced with a chlorosulfonyl group and aromatic radicals having one ring and having from zero to about three hydrogen atoms replaced with straight or branched chain alkane radicals having in the range of one to about four carbon atoms.

7. The method of claim 6 wherein said acid curable composition is selected from the group consisting of a mixture of urea formaldehyde resin and furfuryl alcohol, a mixture of phenol formaldehyde resin and furfuryl alcohol and a mixture of furfuryl alcohol resin and furfuryl alcohol, said composition having a viscosity at 25°C of less than about 100 cps.

8. The method of claim 7 wherein said overflush solution comprises an aliphatic hydrocarbon having a viscosity at 25°C within the range of 1 to about 100 cps and having dissolved therein within the range of about 0.005 to about 25 parts by weight of said acyl halide hardening agent per 100 parts by weight of said aliphatic hydrocarbon.

9. The method of claim 8 wherein said acyl halide is acetyl chloride.

10. The method of claim 8 wherein said acyl halide is benzoyl chloride.

11. The method of claim 8 wherein said acyl halide is phthaloyl chloride.

12. The method of claim 8 wherein said acyl halide is glutaryl chloride.

13. The method of claim 8 wherein said acyl halide is fumaryl chloride.

14. A method of controlling loose sands and the like in a subterranean earth formation comprising the steps of:

depositing against said loose sands and the like a quantity of particulated solids coated with an acid curable resin or resin forming composition; and thereafter introducing an overflush solution containing an acid forming hardening agent into said particulated solids so that said resin composition is cured and said particulated solids are consolidated into a hard fluid permeable but sand impermeable mass, said acid forming hardening agent being selected from the group consisting of:

an acyl halide compound having the general formula

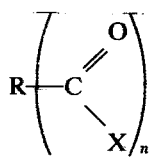

wherein X is fluorine, chlorine, bromine or iodine, $n$ is an integer in the range of about 1 to 4, and R is selected from the group consisting of straight, branched, or cyclic chain alkane or alkene radicals having in the range of from one to about 25 carbon atoms and having from zero to about four hydrogen atoms replaced with fluorine, chlorine, bromine, iodine or mixtures thereof; straight, branched or cyclic chain alkane or alkene radicals having in the range of from one to about 25 carbon atoms and having from one to two hydrogens replaced with methoxy or ethoxy groups or mixtures thereof; and straight, branched or cyclic chain alkane or alkene radicals having in the range of from one to about 25 carbon atoms and having a hydrogen atom replaced with sulfonyl, nitrogen or nitro groups;

an acyl halide compound having the general formula

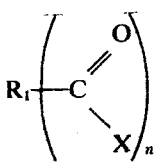

wherein X is fluorine, chlorine, bromine or iodine, $n$ is an integer in the range of about 1 to 4, and $R_1$ is selected from the group consisting of aromatic radicals having one or two rings and having from zero to about four hydrogen atoms replaced with straight or branched chain alkane or alkene radicals having in the range of from one to about 10 carbon atoms; aromatic radicals having one or two rings and having from one to about four hydrogen atoms replaced with fluorine, chlorine, bromine, iodine or mixtures thereof; aromatic radicals having one or two rings and having from one to about three hydrogen atoms replaced with methoxy or ethoxy groups or mixtures thereof; and aromatic radicals having one or two rings and having a hydrogen atom replaced with sulfonyl or nitro groups;

an acyl halide compound having the general formula

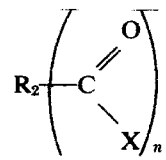

wherein X is fluorine, chlorine, bromine or iodine, $n$ is an integer in the range of from about 1 to 4, and $R_2$ is selected from the group consisting of heterocyclic radicals having one or two rings and having from zero to about two nitrogen atoms in the rings, from zero to one oxygen atom in the rings, from zero to one sulfur atom in the rings, from zero to one nitrogen atom in combination with one oxygen atom in the rings, or from zero to one nitrogen atom in combination with one sulfur atom in the rings; heterocyclic radicals having one or two rings and having from one to about four hydrogen atoms replaced with fluorine, chlorine, bromine, iodine or mixtures thereof; heterocyclic radicals having one or two rings and having from one to about three hydrogen atoms replaced with methoxy or ethoxy groups or mixtures thereof; and heterocyclic radicals having one or two rings and having from one to two hydrogen atoms replaced with sulfonyl or nitro groups; and an acyl halide compound having the general formula

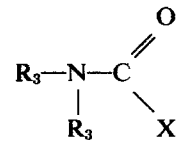

wherein X is fluorine, chlorine, bromine or iodine, and $R_3$ is hydrogen or a straight or branched chain alkane or alkene radical having in the range of from about one to 25 carbon atoms.

15. The method of claim 14 wherein the overflush solution is a liquid aromatic or aliphatic hydrocarbon and the acyl halide hardening agent has a solubility at 25°C in the liquid hydrocarbon of at least about 0.005 parts by weight of said acyl halide hardening agent per 100 parts by weight of said liquid hydrocarbon.

16. The method of claim 15 wherein said acid curable composition is selected from the group consisting of a mixture of urea formaldehyde resin and furfuryl alcohol, a mixture of phenol formaldehyde resin and furfuryl alcohol and a mixture of furfuryl alcohol resin and furfuryl alcohol, said composition having a viscosity at 25°C of less than about 100 cps.

17. The method of claim 16 wherein said overflush solution is an aliphatic hydrocarbon having a viscosity at 25°C within the range of 1 to about 100 cps.

18. The method of claim 17 wherein said acyl halide hardening agent is present in the aliphatic hydrocarbon within the range of about 0.005 to about 25 parts by weight of said acyl halide hardening agent per 100 parts by weight of said aliphatic hydrocarbon.

19. A method of controlling loose sands and the like in a subterranean formation comprising the steps of:
depositing against said loose sands and the like a quantity of particulated solids coated with an acid curable resin or resin forming composition; and
thereafter introducing an overflush solution comprising a liquid aliphatic or aromatic hydrocarbon having dissolved therein an acid forming hardening agent into said particulated solids so that said resin composition is cured and said particulated solids are consolidated into a hard fluid permeable but sand impermeable mass, said acid forming hardening agent being selected from the group consisting of:
an acyl halide having the general formula

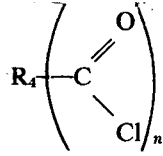

wherein $n$ is an integer in the range of 1 to 2 and $R_4$ is selected from the group consisting of straight or branched chain alkane and alkene radicals having in the range of one to about 10 carbon atoms and having from zero to one hydrogen atom replaced with a chlorosulfonyl group and aromatic radicals having one ring and having from zero to three hydrogen atoms replaced with straight or branched chain alkane radicals having in the range of one to about four carbon atoms.

20. The method of claim 19 wherein said acid curable composition is selected from the group consisting of a mixture of urea formaldehyde resin and furfuryl alcohol, a mixture of phenol formaldehyde resin and furfuryl alcohol and a mixture of furfuryl alcohol resin and furfuryl alcohol, said composition having a viscosity at 25°C of less than about 100 cps.

21. The method of claim 20 wherein said overflush solution comprises an aliphatic hydrocarbon having a viscosity at 25°C within the range of 1 to about 100 cps and having dissolved therein within the range of about 0.005 to about 25 parts by weight of said acyl halide hardening agent per 100 parts by weight of said aliphatic hydrocarbon.

22. The method of claim 21 wherein said acyl halide is acetyl chloride.

23. The method of claim 21 wherein said acyl halide is benzoyl chloride.

24. The method of claim 21 wherein said acyl halide is phthaloyl chloride.

25. The method of claim 21 wherein said acyl halide is glutaryl chloride.

26. The method of claim 21 wherein said acyl halide is fumaryl chloride.

* * * * *

UNITED STATES PATENT OFFICE
CERTIFICATE OF CORRECTION

Patent No. 3,743,019  Dated July 3, 1973

Inventor(s) KENNETH D. TOTTY

It is certified that error appears in the above-identified patent and that said Letters Patent are hereby corrected as shown below:

Column 1, line 43, column 2, line 11, column 2, line 43, column 3, line 8, column 12, line 24, column 13, line 1, column 13, line 29, column 13, line 61, column 15, line 31, column 15, line 60, column 16, line 20 and column 16, line 51, after "iodine", insert -- ion -- . Column 1, line 50, column 2, line 21, column 2, line 55, column 12, line 50, column 13, line 11, column 13, line 42, column 15, line 38, column 16, line 2, and column 16, line 33, after "iodine", insert -- ions -- . Column 1, line 43, column 2, line 11, column 2, line 43, column 3, line 8, column 12, line 24, column 13, line 1, column 13, line 29, column 13, line 61, column 15, line 31, column 15, line 60, column 16, line 20 and column 16, line 51, after "is", insert -- a -- . Column 2, line 27, "a,chlo" should read -- a-chlo -- . Column 6, Footnote 1, after "Durez", cancel "21681" and insert -- 21687 -- . Column 7, line 60 and column 8, line 4, after "composition, cancel "E" and insert -- A -- . Column 9, Table VI under the last column titled "80°F Compressive Strength (PSI), "3893", "2643", "3321", "2679", " 268", " 357", "2305", "2705", "1086", "2696" should read -- 2643 -- , -- 3893 -- , -- 2679 -- , -- 3321 -- , -- 357 -- , -- 268 -- , -- 2705 -- , -- 2305 -- , -- 2696 -- and -- 1086 -- , respectively.

Signed and sealed this 22nd day of January 1974.

(SEAL)
Attest:

EDWARD M. FLETCHER, JR.
Attesting Officer

RENE D. TEGTMEYER
Acting Commissioner of Patents